(12) United States Patent
Kapasi et al.

(10) Patent No.: US 10,395,195 B2
(45) Date of Patent: Aug. 27, 2019

(54) PROVISIONING VIRTUAL MACHINES TO OPTIMIZE APPLICATION LICENSING COSTS

(71) Applicant: INTERNATIONAL BUSINESS MACHINES CORPORATION, Armonk, NY (US)

(72) Inventors: Jigar N. Kapasi, Bangalore (IN); Niranjan Srinivasan, Bangalore (IN); Mahesh Viswanathan, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 14/991,297

(22) Filed: Jan. 8, 2016

(65) Prior Publication Data
US 2017/0200102 A1    Jul. 13, 2017

(51) Int. Cl.
*G06Q 10/06*    (2012.01)
*H04L 29/08*    (2006.01)
*G06F 9/50*     (2006.01)

(52) U.S. Cl.
CPC ..... *G06Q 10/06313* (2013.01); *G06F 9/5077* (2013.01); *H04L 67/10* (2013.01); *G06Q 2220/00* (2013.01)

(58) Field of Classification Search
USPC ......................................................... 705/59
See application file for complete search history.

(56) References Cited

U.S. PATENT DOCUMENTS

| 6,453,344 | B1 * | 9/2002 | Ellsworth | G06F 15/17 709/220 |
|---|---|---|---|---|
| 7,636,693 | B2 | 12/2009 | Faur et al. | |
| 8,185,907 | B2 | 5/2012 | Gusler et al. | |
| 8,930,541 | B2 | 1/2015 | Assuncao et al. | |

(Continued)

OTHER PUBLICATIONS

Cordero et al., "IBM PowerVM Virtualization Introduction and Configuration", Jun. 2013, 8 pages.

(Continued)

*Primary Examiner* — Zeshan Qayyum
(74) *Attorney, Agent, or Firm* — Michael O'Keefe; Matthew M. Hulihan; Heslin Rothenberg Farley & Mesiti PC (57) ABSTRACT

Provisioning and management of virtual machines and shared processor pools to process the virtual machines is provided. Shared processor pool(s) of processing units are established on server(s) of a cluster. The shared processor pool(s) are to process virtual machines to execute an application for which licensing cost is determined based on a number of processing units used to process the virtual machines executing the application. Provision of the virtual machines into the shared processor pool(s) and assignment of the processing units to the shared processor pool(s) is managed, which controls the number of processing units dedicated to processing the virtual machines executing the application, to thereby control licensing costs of executing the application. The managing can provision at least two virtual machines for different tenants into a common shared processor pool of the one or more shared processor pools.

18 Claims, 6 Drawing Sheets

(56) References Cited

U.S. PATENT DOCUMENTS

| | | | |
|---|---|---|---|
| 2006/0136761 A1* | 6/2006 | Frasier | G06F 9/505 |
| | | | 713/320 |
| 2007/0079102 A1* | 4/2007 | Armstrong | G06F 9/4856 |
| | | | 711/173 |
| 2009/0055830 A1* | 2/2009 | Gusler | G06F 9/5061 |
| | | | 718/104 |
| 2011/0302579 A1* | 12/2011 | Shinohara | G06F 9/45533 |
| | | | 718/1 |
| 2013/0019015 A1 | 1/2013 | Devarakonda et al. | |
| 2013/0086273 A1 | 4/2013 | Wray et al. | |
| 2013/0227549 A1* | 8/2013 | Accapadi | G06F 9/5077 |
| | | | 718/1 |
| 2014/0007093 A1* | 1/2014 | Deshpande | G06F 9/45533 |
| | | | 718/1 |
| 2014/0075447 A1 | 3/2014 | Wade | |
| 2014/0325076 A1 | 10/2014 | Madduri et al. | |

OTHER PUBLICATIONS

"Managed Cloud", http://www.ibm.com/marketplace/cloud/managed-cloud/us/en-us, 2 pages.

* cited by examiner

PROVISIONING VIRTUAL MACHINES TO OPTIMIZE APPLICATION LICENSING COSTS

BACKGROUND

Cloud services offerings provide conveniences to entities that manage and/or run applications in the cloud. Those applications may require the purchase of licenses to execute instances of the application. Application licensing is typically dependent on a number of discrete components used to execute an application. In a typical licensing scenario, the number of licenses required for an application is based on the number of processing units used in the execution of the application, and that execution may span several machines consuming several processing units.

SUMMARY

Shortcomings of the prior art are overcome and additional advantages are provided through the provision of a computer-implemented method that includes establishing, on one or more servers of a cluster of servers, one or more shared processor pools of processing units, the one or more shared processor pools to process virtual machines to execute an application for which licensing cost is determined based on a number of processing units used to process the virtual machines executing the application; and managing provision of the virtual machines into the one or more shared processor pools and assignment of the processing units to the one or more shared processor pools, the managing controlling the number of processing units dedicated to processing the virtual machines executing the application to thereby control licensing costs of executing the application, wherein the managing provisions at least two virtual machines for different tenants into a common shared processor pool of the one or more shared processor pools.

Further, a computer system is provided that includes a memory and a processor in communications with the memory, wherein the computer system is configured to perform a method including establishing, on one or more servers of a cluster of servers, one or more shared processor pools of processing units, the one or more shared processor pools to process virtual machines to execute an application for which licensing cost is determined based on a number of processing units used to process the virtual machines executing the application; and managing provision of the virtual machines into the one or more shared processor pools and assignment of the processing units to the one or more shared processor pools, the managing controlling the number of processing units dedicated to processing the virtual machines executing the application to thereby control licensing costs of executing the application, wherein the managing provisions at least two virtual machines for different tenants into a common shared processor pool of the one or more shared processor pools.

Yet further, a computer program product including a computer readable storage medium readable by a processor and storing instructions for execution by the processor is provided for performing a method that includes establishing, on one or more servers of a cluster of servers, one or more shared processor pools of processing units, the one or more shared processor pools to process virtual machines to execute an application for which licensing cost is determined based on a number of processing units used to process the virtual machines executing the application; and managing provision of the virtual machines into the one or more shared processor pools and assignment of the processing units to the one or more shared processor pools, the managing controlling the number of processing units dedicated to processing the virtual machines executing the application to thereby control licensing costs of executing the application, wherein the managing provisions at least two virtual machines for different tenants into a common shared processor pool of the one or more shared processor pools.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities for provisioning virtual machines to shared processor pools and managing those shared processor pools. This can help reduce application licensing costs associated with licensed applications running on the virtual machines.

It is understood in advance that although aspects of this disclosure include descriptions of cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Example characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out, and can also be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Example Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Example Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
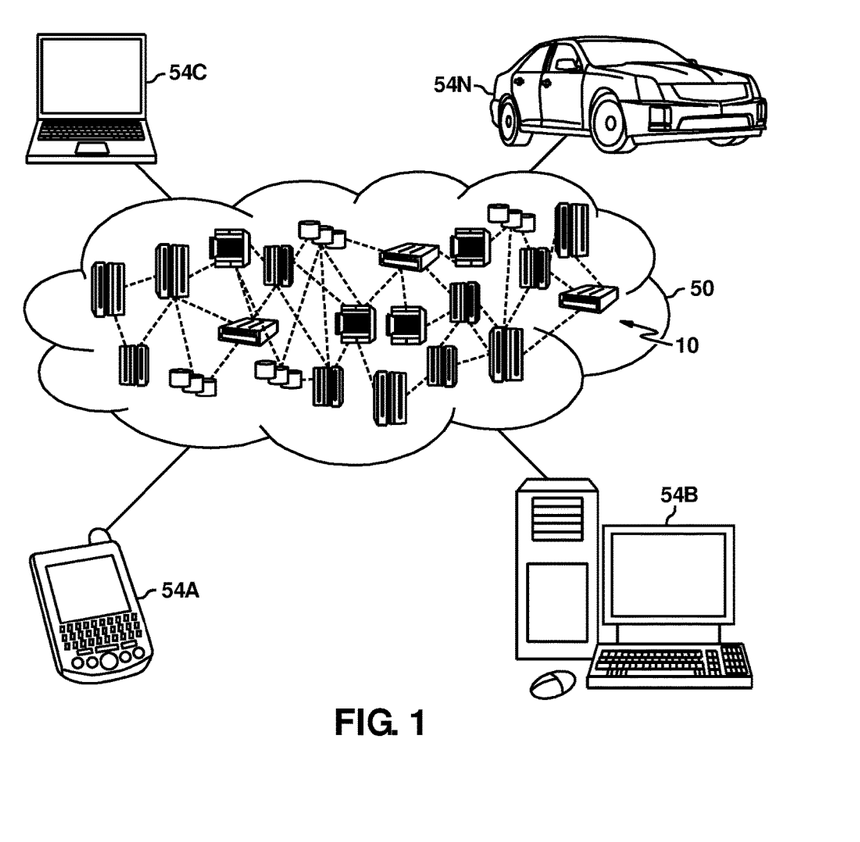
FIG. 1 depicts a cloud computing environment in accordance with aspects described herein.

Referring now to FIG. 1, illustrative cloud computing environment 50 is depicted. As shown, cloud computing environment 50 comprises one or more cloud computing nodes 10 with which local computing devices used by cloud consumers, such as, for example, mobile device 54A (personal digital assistant, cellular telephone, tablet, etc.), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
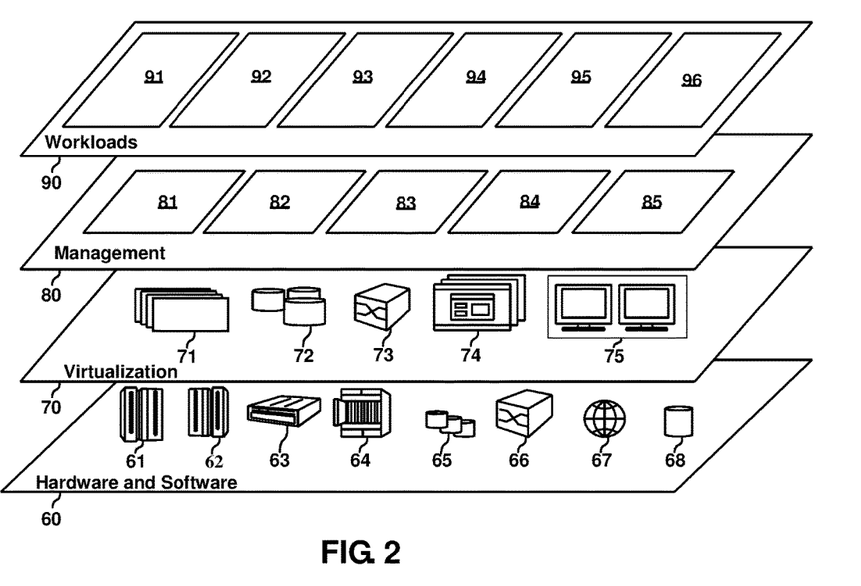
FIG. 2 depicts abstraction model layers in accordance with aspects described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions that may be provided from this layer include: mapping and navigation 91; software development and lifecycle management 92; virtual classroom education delivery 93; data analytics processing 94; transaction processing 95; and customer application execution 96.

IBM Cloud Managed Services™ (CMS) is an example cloud facilities offering for customers (IBM Cloud Managed Services is a trademark of International Business Machines Corporation, Armonk, N.Y., USA), which can incorporate and use aspects described herein. CMS includes (but is not limited to) the following: (i) a request fulfilment component: portal and APIs (ii) a single system of record—a data model and repository of relevant resources; (iii) an aggregator for service management function; (iv) multi-tenant software that executes requests against service levels; (v) infrastructure that is exploited by the software to fulfill both functional and nonfunctional requirements; and (vi) a cloud delivery model for steady-state operations.

Architectural principles of CMS include: standard services, defined delivery catalog, optimized service management; centralized management with automated mechanisms for key ITIL (Information Technology Infrastructure Library) processes; building-block based infrastructure design that can be replicated quickly; and resilient managing environment based on several tools such as IBM SmartCloud® Monitoring, and IBM SmartCloud® Control Desk (IBM SmartCloud® is a registered trademark of International Business Machines Corporation, Armonk, N.Y., USA).

CMS includes managing components that manage other components known as managed components. Managing systems/process refer to a common set of management infrastructure (such as hardware, software, network and storage) among a different set of customers. It may be owned and operated by the cloud provider. It uses a well-defined set of information technology service management processes and leverages the benefits of a homogeneous set of management systems that operate according to uniform policies and principles.

Managed systems are used to optimize hardware and software across different customers' workloads. The managed infrastructure sits on the cloud premises or the customer premises with corresponding ownership of these systems and the licenses for the operating systems running on them. Managed systems allocate hardware and software resources dynamically across different sites. A same multi-tenant solution design may be applied to shared CMS with multiple customers or dedicated CMS for a single large customer, since larger customers tend to have several smaller organizational entities resulting in multi-tenancy isolation needs.

In some examples, the cloud infrastructure is multi-tier including a central tier, site tier, and shared/dedicated PoD tier. At the central tier, a centralized managing hub performs portal, service desk, and service management functions, managing multiple distributed sites in different, perhaps worldwide, locations (sites). A site may be shared (i.e. by many customers with a single multi-tenant managing stack with isolation between customers) or dedicated (i.e. to a single customer with one or more subsidiaries). Each site can contain tools that are used to manage resources across multiple PoDs. The tools can control provisioning, patching, service activation and deactivation, asset collection, and health-checking, as examples. PoDs at any given site may also be configured in a shared or dedicated mode. Each PoD can contain managed-to resources (server, storage and network) that are virtualized, apportioned, and offered to customers. PoDs can also have managed-from tooling, primarily virtualization.

Example features of the central tier include: portal, catalog, service desk, metering, billing, entitlement, user management, subscription management, placement, reservation, capacity, system-of-record, delivery catalog, event management, service management aggregation, incident-problem-change management, SLA management and reporting, service selection, and load balancer and firewall services.

Example features of the site tier include: service automation, workflow execution, patch management, asset management, LDAP/AD management, software installation, image management, event generation, healthcheck, workload migration, storage management, backup management, P/X/Bare-metal technology selection, resource pool selection, image management, request throttling, customer network termination, VM life-cycle management, state updates to CMDB, and migration of existing workloads.

Example features of the PoD tier at a given site include: managed infrastructure, virtualization management, server management, patch staging, customer security data logging, storage management, network management, monitoring, discovery, inventory, hardware management, virtual server creation, placement, updates, movement, and resource consumption and reporting.

Example cloud orchestration provides an end-to-end process implemented in a modular fashion, allowing the implementation decisions to change with each release based on functional and non-functional demand. Some components and features that may be involved in this process include:

An end-user user interface for Service Request submission from the offering catalog;

A Service Request Catalog that includes both cloud (virtual and physical) and non-cloud (or legacy) requests;

Issuance of Service Requests from a request portal. In addition, custom integration of a separate customer-specific portal can be used to enter requests;

A product that implements an interface to obtain requests from the customer legacy systems into the cloud facility. It can integrate the customer's IT service management system into cloud IT service management, for instance;

Integration Framework, as a set of Web service APIs to integrate service requests, incidents, changes, etc.;

Within the integrated systems management systems, a service delivery catalog with internal and external service elements available in the offering;

Service management workflows define for each service the fulfilment method: automated or manual. Job plans and activities are assigned to each service with steps to fulfill the service;

The system of record is the repository for ground truth about the system and its resources. It maintains the system and service resources lifecycle information for management;

Enrichment and building of payloads for service requests. It extends tables in an integrated service management product and contains functions to access and update the state of resources;

A queueing, throttling and bridging channel for request handling across multiple sites. The cloud facilities provide a drop-box for requests distributed from the central tier to the sites. This interacts closely with the SSM in each site. It manages and gates request and event traffic between the central tier and the sites. The SSM pushes requests to the site orchestration for fulfillment and passes status updates back to central for CMDB updates, delivery personnel and customer notification;

A site orchestration tool is a business process modeling and execution tool that supervises site-level workflow orchestration to fulfill compute and managed services requests. It can loosely couple with virtualization managers and managed service providers and drive requests to PoD for infrastructure operations;

Existing scripts and methods, which may be collectively called runbooks, are used for performing actions that are not coded in Business Process Manager (offered by International Business Machines Corporation, Armonk, N.Y., USA) workflows, because they may be complex or not frequently requested, but are instead defined using adhoc scripts and routines to fit specific purposes that can be closely defined to custom need. They permit a high degree of customization but may require close supervision for application;

Managed Services are installed via a Software Installation Service interface. They correspond to the installation, configuration and execution of services that are provided to the customer. They are managed to ITIL standards;

Managed services will execute a corresponding CMDB call post execution;

Infrastructure providers provide virtualization, storage and other hardware layer components that enable the exploitation of that infrastructure using software, abstracts server, storage and network layers for virtualization and definition in software. They manage resources as pools and present an aggregated view of resources that are reflected in the system of record. They also confirm the placement of a request and manage the movement of resource for rebalancing and workload optimization.

Existing methods of provisioning virtual machines (VMs) (or logical partitions (LPARs), used interchangeably herein), in a typical multi-tenant cloud environment fail to adequately consider optimizing the consumption of application licenses. As noted, application licenses are typically purchased for either individual virtual machines or for the entire physical server (e.g., based on virtual central processing units (CPUs)/physical cores configuration, depending on the vendor). In some cloud environments, such as those including Power Systems™ servers, licenses are often based on the number of virtual CPUs, also called virtual processors, configured as part of a VM (Power Systems is a trademark of International Business Machines Corporation, Armonk, N.Y., USA). However, virtual CPUs tend to be sized for peak CPU utilization, and the sum of the virtual CPUs of an individual VM or LPAR on the system would serve as the basis on which the number of necessary application licenses is determined and purchased. As an example, one application license may be needed for each virtual CPU provisioned to the VM executing the application. Depending on characteristics of the systems and usage, licensing costs can be high.

However, since separate VMs may not peak at the same time and some VMs remain idle or relatively lightly utilized in a cloud environment, there is an opportunity according to aspects described herein to provision VMs intelligently into shared resource pools, such as shared processor pools of processing units, a technology supported by the Power® technology, to optimize license cost (Power® is a registered trademark of International Business Machines Corporation, Armonk, N.Y., USA). Described herein are methods to provision VMs in a cloud environment of servers to optimize a number of applications licenses and therefore licensing costs associated with executing those applications. Although examples described herein relate to a cloud service provider supplying application licenses to tenants (customer VMs), aspects described herein can be extended to enable individual customers to optimize license costs across their various applications.

Consider two customers each running four vCPU (virtual CPU) VMs supporting a database application. In a capped configuration, if it is known when these VMs peak, there is an option to create two capped VMs with peak utilization as the entitled capacity. For example, if the peak utilization of each of the two VMs is four cores and average utilization is two cores, then the service provider would provision each VM with an entitled capacity of four cores each (capped), and would therefore purchase eight licenses for the database application (assuming one license per core).

In an uncapped configuration, the service provider configures the entitled capacity of both VMs to two cores each (based on average utilization) but vCPUs is set to four each to allow for expansion to handle peak utilization. The advantage of using the uncapped configuration is that now additional VMs/LPARs may be accommodated on the physical server as compared to the capped configuration above because the entitled capacity is based on the average utilization rather than peak utilization. This option allows the cloud service provider to overcommit CPU resources by configuring lower guaranteed capacity (entitled capacity), and using the remaining capacity to configure additional VMs/LPARs (assuming that the physical server has enough resources like CPU and memory). However, again, the licenses billed would be eight (based on four vCPUs for each of the VMs).

If the service provider uses uncapped partitions as part of a shared pool and then the provider finds by monitoring the shared pool that the combined CPU utilization of the two VMs during peak load is 6 vCPUs (four vCPUs+two vCPUs), that provides an opportunity for all eight vCPUs of the two VMs to be contained to run on 6 physical cores, thereby reducing the license requirement from eight to six. This option gives the cloud service provider the flexibility to have a high overcommit ratio while reducing the number of licenses. In this configuration, the cloud service provider has saved on (1) infrastructure by using only six cores instead of eight (using overcommit to configure eight VCPUs on 6 cores), and has saved on license costs by buying only six licenses versus eight. As the number of VMs in consideration (i.e. in the pool) increases, significantly expanded costs savings are realized.

A method of licensing optimization exists that make use of separate components such as license broker, external license servers and databases. However, with introduction of these additional components, the network load between these components would increase and may overload the existing cloud infrastructure. Also, maintaining these servers often requires additional efforts since these components are typically installed on separate VMs. Additionally, in the above-noted method, the licenses are usually provisioned based on user-demand for software without considering optimization during deployment. In contrast, aspects described herein need not involve additional external components, which simplifies the management. Furthermore, aspects described herein can consider user demand as well as license optimization based on utilization.

In addition, prior approaches fail to provide multiple shared processor pools per server (i.e. per application running on that server) and assigning processor sets and VMs—perhaps for differing tenants—to each pool, while optimizing the pool sizes (and therefore application licenses) based on pool utilization, let alone doing so in cloud environments.

According to aspects described herein, cloud-provided VMs are provisioned to shared processor pools and managed along with the shared processor pools to minimize the number of application licenses for executing applications. As an example, if demand on a group of twenty VMs is known (or confidently predicted) to not exceed a particular capacity, say 10 processing cores, then a shared processor pool of 10processing units can be established for the twenty VMs in the group, instead of an alternative in which each VM has a respective processing unit assigned to it. The group of twenty VMs share processing resources—the 10 processing units—and the licensing needed is based on 10 processing units. Assuming one license is needed per processing unit, then only 10 licenses are needed.

A shared processor pool (SPP), also referred to herein as a shared pool (SP), is a logical entity of a single physical server. A single SPP does not span across multiple physical servers, but each server can have multiple SPPs, for multiple applications. This SPP approach can be used on several physical servers that may be needed to run the requisite number of VMs supporting the application. The SPP capability allows the user to define SPPs with the purpose of controlling the processor capacity that can be consumed from the physical SPP. Multiple SPPs can be used to isolate workloads in a pool and thus not exceed an upper CPU limit. Multiple SPPs can also be useful for software license management where sub-capacity licensing is involved.

A provisioning engine can create SPPs per application based on parameters such as physical server utilization and availability of spare capacity on a server, as described below. Multiple tenants (customers) using the same application may therefore be provisioned on a common shared pool. The provisioning engine will keep track of shared pool statistics in an internal resource database (as an example), which can include parameters such as SP Name, SP size, server on which an SP resides, and a number of licenses available for a particular application. These values can be updated as VMs are provisioned and de-provisioned. Additionally, since the resource database can be updated during VM provisioning/deletion, agents for tracking application licenses used are not required to be present on the individual VMs. The following table presents an example data structure with example shared pool statistics:

| Application | <Number of licenses with CSP> \|\| <SP Name>\|<SP Capacity>\| <POD>\|<Physical Server> |
|---|---|
| Oracle | 64 \|\| OraPool1\|16\|NY_POD1\|NY_p_Server1\|OraPool2\|8\|NY_POD1\|NY_p_Server2 |
| WAS | 32 \|\| WASPool1\|8\|NY_POD1\|NY_p_Server1\|WASPool2\|4\|NY_POD1\|NY_p_Server2 |
| DB2 | ... |
| GPFS | ... |
| FileNet | ... |

In the table above, statics are shown for two applications, Oracle and WAS. At any point in time, the "Number of Licenses with CSP" parameter indicates the number of licenses available with the cloud service provider for the given application. The cloud provider can periodically return unused licenses or re-deploy them elsewhere, as examples. It is noted that for a given application, there may be multiple shared pools, each on a respective server. In the example above, the WAS application is served by a first pool "WASpool1" on a first server "NY_p_Server1" and a second pool "WASpool2" on a second server "NY_p_Server2". It is also noted that these two servers also serve the Oracle application as part of two shared pools corresponding to that application.

The application shared pools sizes can be kept optimized based on utilization and allocation statistics. By resizing the shared pools as needed (referring to adding or deleting processing units assigned to the pool), license requirement are also kept optimal.

Figure 3:
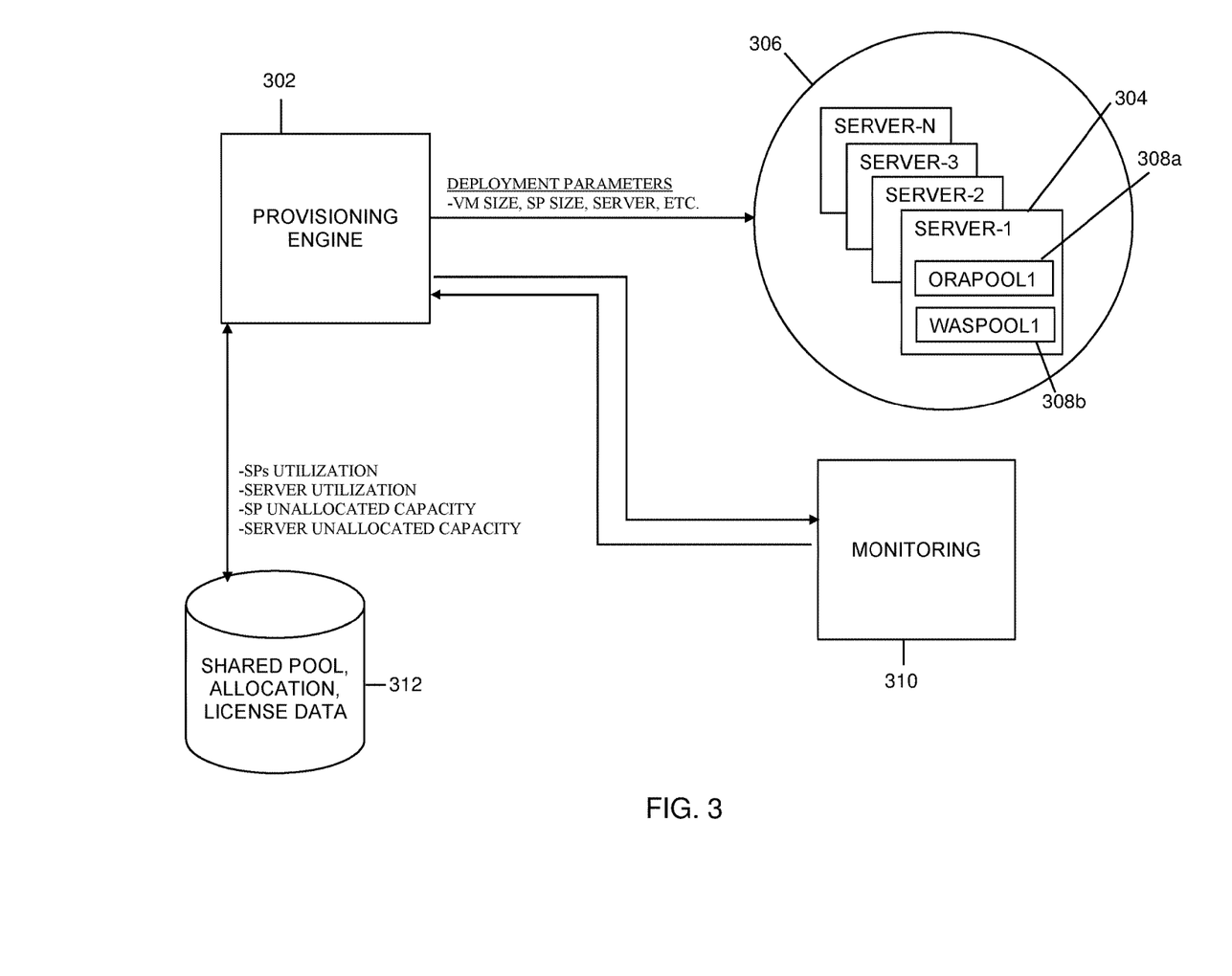
FIG. 3 depicts a components view of facilities for optimizing shared processor pools, in accordance with aspects described herein.

Referring to FIG. 3, which presents a components view of facilities for optimizing shared processor pools, the provisioning engine 302 determines the placement of VMs (i.e. into the physical server(s) 304 of the cluster 306) and creation of application shared processor pools. The shared processor pool(s) are created as logical entities on these physical servers. In FIG. 3, two application shared processor pools are shown created on SERVER 1 304: ORAPOOL1 308a to process virtual machine(s) provisioned on Server 1 304 for executing the Oracle application, and WASPOOL1 308b to process virtual machine(s) provisioned on Server 1 304 for executing the WAS application. The provisioning engine 302 provides deployment parameters to specify the characteristics of the VMs being provisioned and SPPs being established and maintained. Example such parameters as indicated in FIG. 3 include VM size, SP size, and identification of the server(s) involved. VM size can refer to resource allocation/assignment generally, rather than size on disk per se, though size on disk may factor into the VM 'size'.

The provisioning engine 302 places the VMs and creates/maintains the SPPs based on utilization and allocation data it receives from a monitoring component 310, which monitors for any relevant data, such as SPP utilization, SPP unallocated capacity, server utilization, and server unallocated capacity (as exampled), which are stored in a Shared Pool, Allocation, License Data database 312. Customer requests (i.e. for VMs to service application requests) are processed by the provisioning engine 302 and deployed to appropriate shared processor pools according to provisioning logic, an example of which is presented in FIG. 4 and described below. Post successful provisioning of a given VM, the resource database 312 is updated with the latest deployment and license information.

Though these components could reside at any of various locations, in a specific embodiment, the provisioning engine 302 is at the cloud site where the physical servers reside and the database 312 and the monitoring component 310 are maintained as physical and/or logical components as part of one or more VMs maintained by the cloud provider (either at the site or perhaps elsewhere). It is noted with respect to the managed vs. managing paradigm discussed above, the provisioning engine 302, database 312, and monitoring component 310 may be part of the managing environment.

Figure 4:
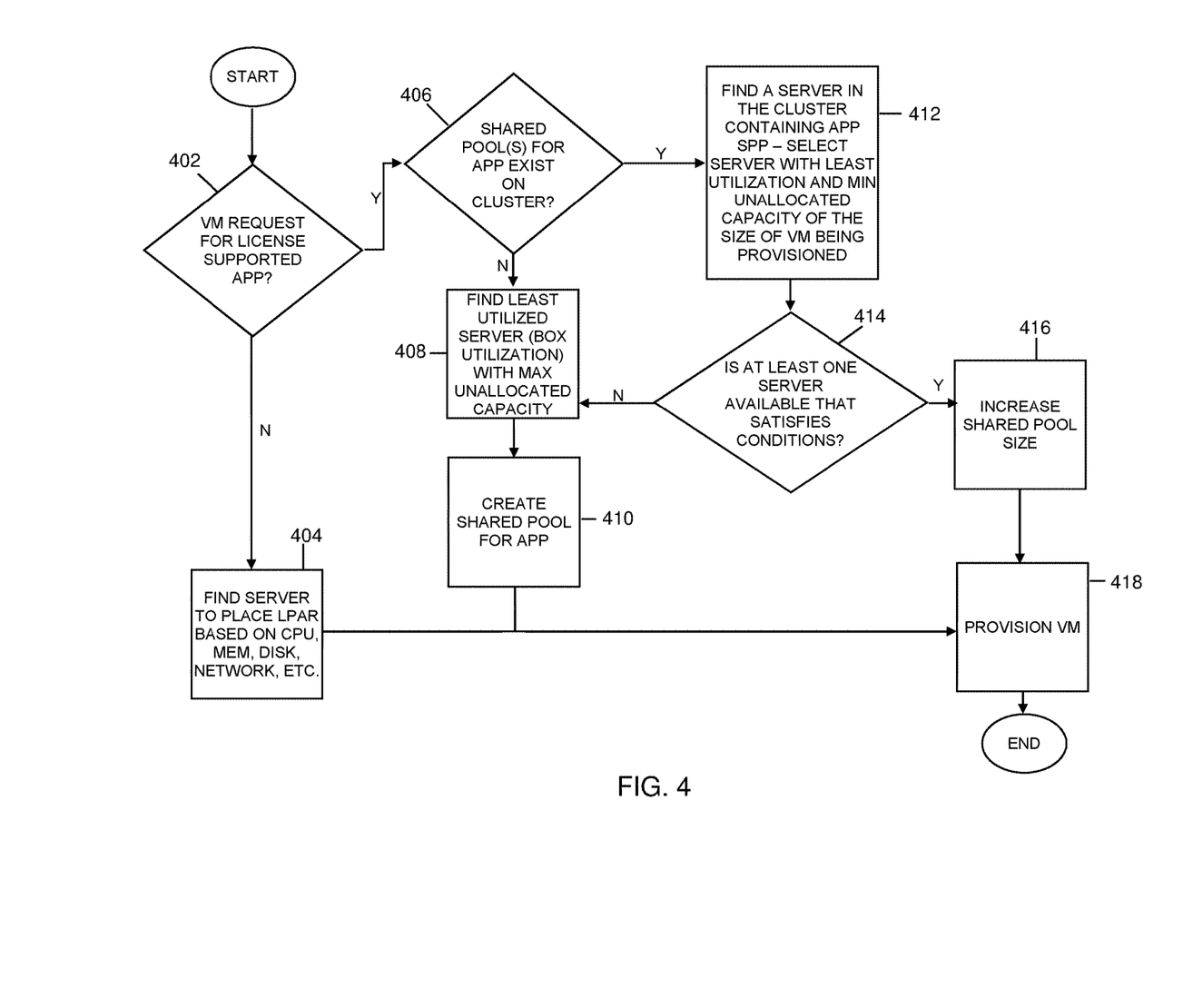
FIG. 4 depicts an example process for placing virtual machines in application shared pools using utilization, in accordance with aspects described herein.

FIG. 4 depicts an example process for placing virtual machines in application shared pools using utilization, in accordance with aspects described herein. The process includes the creation/resizing of the shared pools for VM placement. The VMs will be provisioned on existing application shared pools if they are available and can accommodate the newly requested VMs by expanding the size or a target pool. If shared pools for the application being deployed are not yet created, or if existing shared pools cannot be expanded to accommodate new VMs, then new shared pool(s) are created on other physical servers in the cloud where spare capacity is available.

The process of FIG. 4 is performed by a provisioning engine as an example, and is triggered based on a request for a VM. Based on triggering the process, it is determined whether the VM request is one for a license-supported application (402). If not, the process continues by finding a server to place the VM/LPAR (404) based on processing, memory, disk, network, or any other characteristics (for instance expected utilization of one or more of these by the VM, and current utilization of one or more of these on the physical servers). Once the server is found, the VM is provisioned (418) on the server.

If instead at 402 the VM request is one for a license-supported application, then the process continues by determining whether shared pool(s) for the application exist on the cluster of physical servers (406). If not, then the least utilized physical server is identified having the most unallocated capacity (408) and a shared pool for the application is created on that physical server (410). The VM is then provisioned to the server (418), and specifically as part of that newly created shared pool thereon.

If instead at 406 it is determined that one or more shared pools for the application do exist on the cluster, the process continues by attempting to find a server, in the cluster, that has a shared processor pool for the application established thereon (412), and determining whether any is found that satisfies the conditions (414). In this regard, a selection strategy, such as the one with least utilization and least unallocated capacity of the size of the VM being provisioned, may be used. If at 414 it is determined that no physical server satisfies the conditions to provision the VM thereon, then a new shared pool is needed on a physical server. Therefore, the process continues to 408 to identify the least utilized physical server having the most unallocated capacity, establish a shared pool for the application thereon (410), and provision the VM (418).

If instead at 414 it is determined that at least one server satisfies the conditions for provisioning the VM thereon, one is selected and the shared processor pool size is increased (if necessary) (416) to accommodate the to-be-provisioned VM. The VM is then provisioned (418) on the server specifically as part of that shared processor pool.

Resizing of a shared processor pool may be appropriate because the workload running on the VMs that are part of the pool might vary over time. Expansion or shrinking of the pool may therefore be necessary. Once VMs are provisioned, the monitoring component 310 will monitor these shared pools (continually in one example) and feed the utilization data to the provisioning engine 302. Based on the monitoring data, the provisioning engine can then issue commands/APIs to change the size of the shared processor pool(s). The resource database 312 is kept updated on the shared pool statistics and number of application licenses.

By shrinking the shared processor pool size when capacity is not needed, and by increasing the pool size in a 'just-in-time' fashion, the number of application licenses used is optimized at a lowest number. By minimizing shared pool size, the number of processing units to run the applications is minimized, which minimizes the number of licenses needed, which in turn minimizes licensing costs.

In addition, it allows the cloud service provider to "overcommit" licenses is desired. This would involve sharing application licenses between tenants by taking advantage of workload utilization patterns. Additional cost benefits of this approach are realized by the cloud service provider, and these savings may optionally also be passed on to customers.

Accordingly, allocation of resources to a new workload instance of a particular workload type is described. Licensing costs are optimized while at the same time allowing multiple workload instances to maximize usage of allocated resources without capping the resource allocated to any of the workloads instances in a multi-tenant cloud environment. The approach also allows tuning of the resources allocated to a set of workload instances to release unused resources to handle other workload types.

Aspects described herein include establishing, on one or more servers of a cluster of servers, one or more shared processor pools of processing units, the one or more shared processor pools to process virtual machines to execute an application for which licensing cost is determined based on a number of processing units used to process the virtual machines executing the application. Further aspects include managing provision of the virtual machines into the one or more shared processor pools and assignment of the processing units to the one or more shared processor pools, the managing controlling the number of processing units dedicated to processing the virtual machines executing the application to thereby control licensing costs of executing the application. The managing may provision at least two virtual machines for different tenants into a common shared processor pool of the one or more shared processor pools.

Initially, it may be determined, based on a tenant request to provision a virtual machine to execute the application, whether a shared processor pool for the application exists. If one does not yet exist, the establishing includes establishing a shared processor pool, of the one or more shared processor pools, on a server, of the one or more servers, identified as having greatest unallocated capacity of the one or more servers of the cluster, and the managing includes provisioning the virtual machine into the established shared processor pool on the server.

If, however, one (or more) shared processor pools for the application do exist, it may be determined whether at least one server, of the one or more servers of the cluster, exists having enough unallocated capacity to support a size of the virtual machine to be provisioned. If no such server exists of the one or more servers exists having enough unallocated capacity to support the size of the virtual machine to be provisioned, the establishing includes establishing a shared processor pool, of the one or more shared processor pools, on a server, of the one or more servers, identified as having greatest unallocated capacity of the one or more servers of the cluster, and the managing includes provisioning the virtual machine into the established shared processor pool on the server.

If, instead, it is determined that at least one server (having a shared processor pool thereon) exists having enough unallocated capacity to support the size of the virtual machine to be provisioned, the managing includes selecting a server, of the at least one server, having least utilization out of the server(s) of the at least one server, and provisioning the virtual machine into the shared processor pool on that server. As part of this, it may be necessary to expand the pool size, in which case, as part of the managing the provision of the virtual machines, a size of the shared processor pool on the server prior to provisioning the virtual machine is increased by assigning at least one additional processing unit to the shared processor pool, and the provisioning of the virtual machine into the shared processor pool is performed based on the increasing the size of the shared processor pool on the server.

Additionally, processing unit utilization of the one or more shared processor pools may be monitored, and the managing includes dynamically resizing a shared processor pool of the one or more shared processor pools based on the monitoring, where the dynamically resizing includes changing a number of processing units assigned to the shared processor pool, and the dynamically resizing optimizes a number of processing units to execute the application, and therefore a corresponding number application licenses and licensing cost. As an example, dynamically resizing includes decreasing a size of the shared processor pool by unassigning from the shared processor pool at least one processing unit, based on one or more utilization levels of the shared processor pool by at least one virtual machine provisioned to the shared processor pool.

Figure 5:
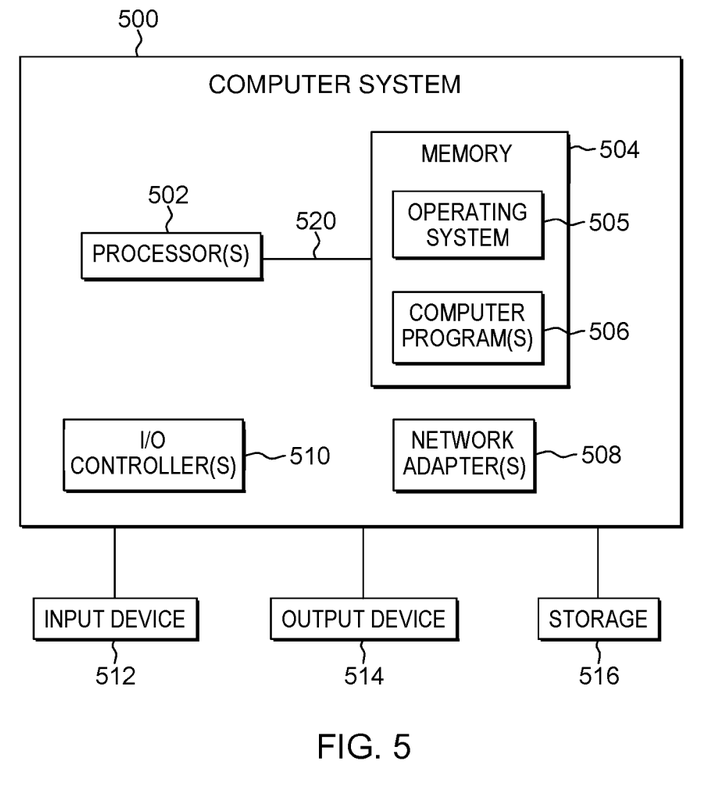
FIG. 5 depicts an example of a computer system to incorporate and use aspects described herein.

Processes described herein may be performed singly or collectively by one or more computer systems. FIG. 12 depicts one example of a computer system to incorporate and use aspects described herein. A computer system may also be referred to herein as a processing device/system or computing device/system, or simply a computer. Computer system 500 may be based on one or more of various system architectures such as those offered by International Business Machines Corporation (Armonk, N.Y., USA) or Intel Corporation (Santa Clara, Calif., USA), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs to perform aspects described herein.

Input/Output (I/O) devices 512, 514 (including but not limited to displays, microphones, speakers, accelerometers, gyroscopes, magnetometers, light sensors, proximity sensors, GPS devices, cameras, etc.) may be coupled to the system either directly or through I/O controllers 510.

Network adapters 508 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 508 used in computer system.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may include any computing device known in the art, such as a mainframe, server, personal computer, workstation, laptop, handheld or mobile computer, tablet, wearable device, telephony device, network appliance, virtualization device, storage controller, etc.

Figure 6:
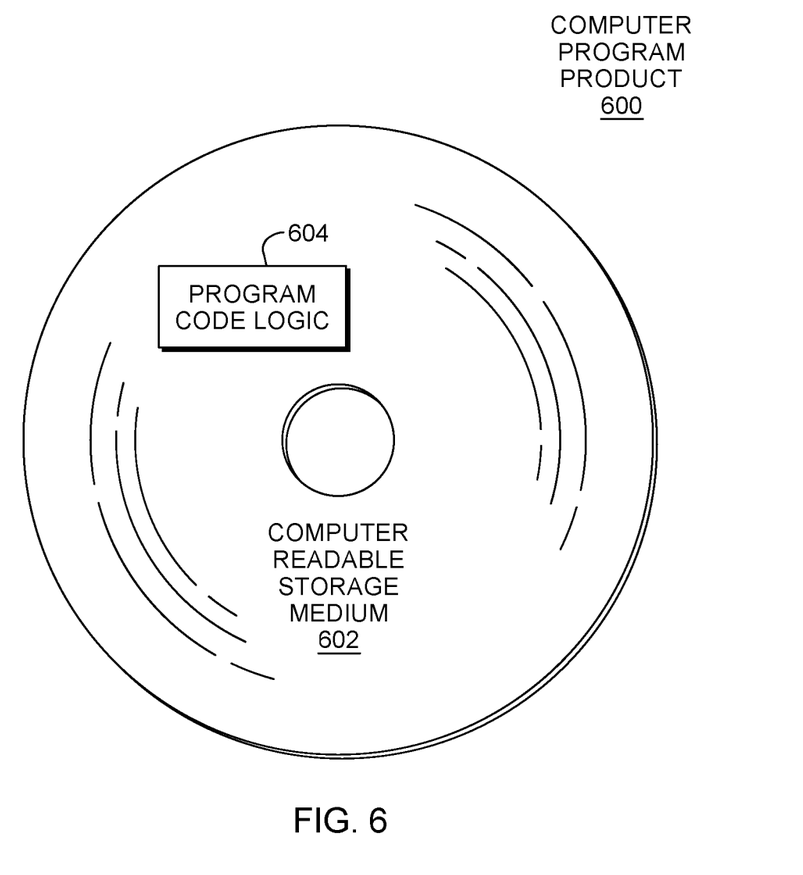
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   establishing, by a provisioning engine executing on at least one processor, one or more shared processor pools of physical processing units on one or more servers of a cluster of servers;
   provisioning, by the provisioning engine, virtual machines into the one or more shared processor pools and assigning the physical processing units to the one or more shared processor pools, the provisioning and assigning comprising:
      provisioning at least two virtual machines for different tenants into a common shared processor pool of one or more shared processor pools;
      receiving a tenant request by a tenant of the different tenants to provision a virtual machine of the virtual machines to execute an application;
      determining based on the received request that at least one shared processor pool for the application does not yet exist;
      identifying based on determining that at least one shared processor pool for the application does not yet exist, a server of the one or more servers of the cluster of servers having greatest unallocated capacity;
      establishing a target shared processor pool on the identified server;
      provisioning the virtual machine into the established target shared processor pool on the identified server;

obtaining utilization data by continuously monitoring the one or more shared processor pools of physical processing units on one or more servers of a cluster of servers;

determining based on the obtained utilization data that at least one physical processing unit of at least one shared processor pool of the one or more shared processor pools provides excess capacity; and resizing the at least one shared processor pool of the one or more shared processor pools by removing the at least one physical processing unit from the at least one shared processor pool of the one or more shared processor pools; and executing the virtual machines using the one or more shared processor pools, wherein the executing executes at least one virtual machine of the virtual machines using the resized at least one shared processor pool.

2. The method of claim 1, further comprising determining, based on a tenant request by another tenant of the different tenants to provision another virtual machine, of the at least two virtual machines, to execute the application, whether at least one shared processor pool for the application exists.

3. The method of claim 2, wherein based on determining that the at least one shared processor pool for the application does exist, the method further comprises determining whether at least one server, of the one or more servers of the cluster, exists having enough unallocated capacity to support a size of the another virtual machine to be provisioned.

4. The method of claim 3, wherein based on determining that no server of the one or more servers exists having enough unallocated capacity to support a size of the another virtual machine to be provisioned, the establishing comprises establishing another target shared processor pool, of the one or more shared processor pools, on another server, of the one or more servers, identified as having greatest unallocated capacity of the one or more servers of the cluster, and the provisioning and assigning comprises provisioning the another virtual machine into the established another target shared processor pool on the another server.

5. The method of claim 3, wherein based on determining that at least one server exists having enough unallocated capacity to support the size of the another virtual machine to be provisioned, the provisioning and assigning comprises:

selecting another server, of the at least one server, having least utilization of the at least one server; and provisioning the another virtual machine into another target shared processor pool on the another server.

6. The method of claim 5, wherein the provisioning and assigning further comprises increasing a size of the another target shared processor pool on the another server prior to provisioning the another virtual machine, by assigning at least one additional physical processing unit to the another target shared processor pool, and wherein the provisioning the another virtual machine into the another target shared processor pool is performed based on the increasing the size of the another target shared processor pool on the another server.

7. The method of claim 1, further comprising monitoring physical processing unit utilization of the one or more shared processor pools, wherein the resizing optimizes a number of physical processing units to execute the application thereby optimizing a corresponding number of application licenses to execute the application, and the optimizing the corresponding number of application licenses optimizes licensing cost of executing the application.

8. The method of claim 7, wherein the resizing is performed based on determining one or more utilization levels of the at least one shared processor pool of the one or more shared processor pools by one or more virtual machines provisioned to the at least one shared processor pool of the one or more shared processor pools.

9. The method of claim 1, further comprising:

establishing on the one or more servers of the cluster at least one other shared processor pool of other physical processing units;

resizing another shared processor pool, of the at least one other shared processor pool, by adding to the another shared processor pool the at least one physical processing unit removed from the at least one shared processor pool of the one or more shared processor pools, the adding increasing a number of physical processing units, of the another shared processor pool, dedicated to processing other virtual machines executing another application.

10. A computer system comprising:

a memory; and a processor in communication with the memory, wherein the computer system is configured to perform a method, the method comprising:

establishing, by a provisioning engine executing on at least one processor, one or more shared processor pools of physical processing units on one or more servers of a cluster of servers;

provisioning, by the provisioning engine, virtual machines into the one or more shared processor pools and assigning the physical processing units to the one or more shared processor pools, the provisioning and assigning comprising:

provisioning at least two virtual machines for different tenants into a common shared processor pool of one or more shared processor pools;

receiving a tenant request by a tenant of the different tenants to provision a virtual machine of the virtual machines to execute an application;

determining based on the received request that at least one shared processor pool for the application does not yet exist;

identifying based on determining that at least one shared processor pool for the application does not yet exist, a server of the one or more servers of the cluster of servers having greatest unallocated capacity;

establishing a target shared processor pool on the identified server;

provisioning the virtual machine into the established target shared processor pool on the identified server;

obtaining utilization data by continuously monitoring the one or more shared processor pools of physical processing units on one or more servers of a cluster of servers;

determining based on the obtained utilization data that at least one physical processing unit of at least one shared processor pool of the one or more shared processor pools provides excess capacity; and resizing the at least one shared processor pool of the one or more shared processor pools by removing the at least one physical processing unit from the at least one shared processor pool of the one or more shared processor pools; and executing the virtual machines using the one or more shared processor pools, wherein the executing executes at least one virtual machine of the virtual machines using the resized at least one shared processor pool.

11. The computer system of claim 10, wherein the method further comprises determining, based on a tenant request by another tenant of the different tenants to provision another virtual machine, of the at least two virtual machines, to execute the application, whether at least one shared processor pool for the application exists, wherein based on determining that the at least one shared processor pool for the application does exist, the method further comprises determining whether at least one server, of the one or more servers of the cluster, exists having enough unallocated capacity to support a size of the another virtual machine to be provisioned.

12. The computer system of claim 11, wherein based on determining that no server of the one or more servers exists having enough unallocated capacity to support a size of the another virtual machine to be provisioned, the establishing comprises establishing another target shared processor pool, of the one or more shared processor pools, on another server, of the one or more servers, identified as having greatest unallocated capacity of the one or more servers of the cluster, and the provisioning and assigning comprises provisioning the another virtual machine into the established another target shared processor pool on the another server.

13. The computer system of claim 11, wherein based on determining that at least one server exists having enough unallocated capacity to support the size of the another virtual machine to be provisioned, the provisioning and assigning comprises:
   selecting another server, of the at least one server, having least utilization of the at least one server; and
   provisioning the another virtual machine into another target shared processor pool on the another server.

14. The computer system of claim 13, wherein the provisioning and assigning further comprises increasing a size of the another target shared processor pool on the another server prior to provisioning the another virtual machine, by assigning at least one additional physical processing unit to the another target shared processor pool, and wherein the provisioning the another virtual machine into the another target shared processor pool is performed based on the increasing the size of the another target shared processor pool on the another server.

15. The computer system of claim 10, wherein the method further comprises monitoring physical processing unit utilization of the one or more shared processor pools, wherein the resizing optimizes a number of physical processing units to execute the application thereby optimizing a corresponding number of application licenses to execute the application, and the optimizing the corresponding number of application licenses optimizes licensing cost of executing the application.

16. The computer system of claim 15, wherein the resizing is performed based on determining one or more utilization levels of the at least one shared processor pool of the one or more shared processor pools by one or more virtual machines provisioned to the at least one shared processor pool of the one or more shared processor pools.

17. A computer program product comprising:
a computer readable storage medium readable by a processing circuit and storing instructions for execution by the processing circuit for performing a method comprising:
   establishing, by a provisioning engine executing on at least one processor, one or more shared processor pools of physical processing units on one or more servers of a cluster of servers;
   provisioning, by the provisioning engine, virtual machines into the one or more shared processor pools and assigning the physical processing units to the one or more shared processor pools, the provisioning and assigning comprising:
      provisioning at least two virtual machines for different tenants into a common shared processor pool of one or more shared processor pools;
      receiving a tenant request by a tenant of the different tenants to provision a virtual machine of the virtual machines to execute an application;
      determining based on the received request that at least one shared processor pool for the application does not yet exist;
      identifying based on determining that at least one shared processor pool for the application does not yet exist, a server of the one or more servers of the cluster of servers having greatest unallocated capacity;
      establishing a target shared processor pool on the identified server;
      provisioning the virtual machine into the established target shared processor pool on the identified server;
   obtaining utilization data by continuously monitoring the one or more shared processor pools of physical processing units on one or more servers of a cluster of servers;
   determining based on the obtained utilization data that at least one physical processing unit of at least one shared processor pool of the one or more shared processor pools provides excess capacity; and
   resizing the at least one shared processor pool of the one or more shared processor pools by removing the at least one physical processing unit from the at least one shared processor pool of the one or more shared processor pools; and
   executing the virtual machines using the one or more shared processor pools, wherein the executing executes at least one virtual machine of the virtual machines using the resized at least one shared processor pool.

18. The computer program product of claim 17, wherein the method further comprises monitoring physical processing unit utilization of the one or more shared processor pools, wherein the resizing optimizes a number of physical processing units to execute the application, thereby optimizing a corresponding number of application licenses to execute the application, and the optimizing the corresponding number of application licenses optimizes licensing cost of executing the application.

* * * * *